United States Patent [19]

Trujillo

[11] Patent Number: 5,216,944
[45] Date of Patent: Jun. 8, 1993

[54] TOASTER COVER DOOR APPARATUS

[76] Inventor: Arthur S. Trujillo, 123 Royal View, Pueblo, Colo. 81005

[21] Appl. No.: 900,675

[22] Filed: Jun. 19, 1992

[51] Int. Cl.⁵ ............................................. A47J 37/08
[52] U.S. Cl. ...................................... 99/339; 99/345; 99/385; 99/389; 99/391; 219/521
[58] Field of Search ........................... 99/326–328, 99/329 R, 329 P, 329 RT, 334, 335, 339, 389–393, 385, 340, 399, 345, 401, 402; 219/521, 537, 386, 413

[56] References Cited

U.S. PATENT DOCUMENTS

| | | | |
|---|---|---|---|
| 101,361 | 3/1870 | Graham | 99/401 |
| 1,720,800 | 7/1929 | Morrison | 99/328 |
| 2,320,951 | 6/1943 | Russell | 99/389 |
| 2,662,465 | 12/1953 | Beer | 99/391 |
| 2,739,525 | 3/1956 | Giambertoni | 99/401 |
| 3,279,350 | 10/1966 | Kaplan | 99/390 |
| 3,416,430 | 12/1968 | Hauser | 99/401 |
| 4,216,372 | 8/1980 | Huggler | 219/521 |
| 4,404,899 | 9/1983 | Weiss | 99/332 |
| 4,889,042 | 12/1989 | Hantz et al. | 99/337 |
| 4,976,195 | 12/1990 | Cavazos | 99/391 |

FOREIGN PATENT DOCUMENTS 2431056  1/1976  Fed. Rep. of Germany ........ 99/385

Primary Examiner—Timothy F. Simone
Attorney, Agent, or Firm—Leon Gilden

[57] ABSTRACT

A cover door structure is arranged for mounting to a top wall of a toaster assembly to selectively overlie the bread receiving slots directed through the top wall of the associated toaster for heat conservation and accelerated toasting of bread directed within the toaster structure. Manual or automatic cooperation of the doors are arranged relative to an associated toaster assembly.

4 Claims, 4 Drawing Sheets

TOASTER COVER DOOR APPARATUS

BACKGROUND OF THE INVENTION

1. Field of the Invention

The field of invention relates to toaster apparatus, and more particularly pertains to a new and improved toaster cover door apparatus wherein the same is arranged to selectively overlie bread receiving slots of an associated toaster.

2. Description of the Prior Art

The bread receiving slots of a typical toaster assembly effects release and loss of heat through the slots during a toasting procedure. The instant invention attempts to overcome deficiencies of the prior art by providing a totally enclosed toaster structure to minimize such heat loss. Prior art toaster apparatus as indicated in the prior art has been set forth in the U.S. Pat. Nos. 4,972,768; 4,734,562; 4,455,479; 4,889,042; and 4,538,049.

As such, it may be appreciated that there continues to be a need for a new and improved toaster cover door apparatus as set forth by the instant invention which addresses both the problems of ease of use as well as effectiveness in construction in providing for enclosing of a toaster during a bread toasting procedure and in this respect, the present invention substantially fulfills this need.

SUMMARY OF THE INVENTION

In view of the foregoing disadvantages inherent in the known types of toaster apparatus now present in the prior art, the present invention provides an toaster cover door apparatus wherein the same provides for pivotally mounted doors overlying toaster slots through the top wall of the toaster. As such, the general purpose of the present invention, which will be described subsequently in greater detail, is to provide a new and improved toaster cover door apparatus which has all the advantages of the prior art toaster apparatus and none of the disadvantages.

To attain this, the present invention provides a cover door structure arranged for mounting to a top wall of a toaster assembly to selectively overlie the bread receiving slots directed through the top wall of the associated toaster for heat conservation and accelerated toasting of bread directed within the toaster structure. Manual or automatic cooperation of the doors are arranged relative to an associated toaster assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toaster cover door apparatus which has all the advantages of the prior art toaster apparatus and none of the disadvantages.

It is another object of the present invention to provide a new and improved toaster cover door apparatus which may be easily and efficiently manufactured and marketed.

It is a further object of the present invention to provide a new and improved toaster cover door apparatus which is of a durable and reliable construction.

An even further object of the present invention is to provide a new and improved toaster cover door apparatus which is susceptible of a low cost of manufacture with regard to both materials and labor, and which accordingly is then susceptible of low prices of sale to the consuming public, thereby making such toaster cover door apparatus economically available to the buying public.

Still yet another object of the present invention is to provide a new and improved toaster cover door apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
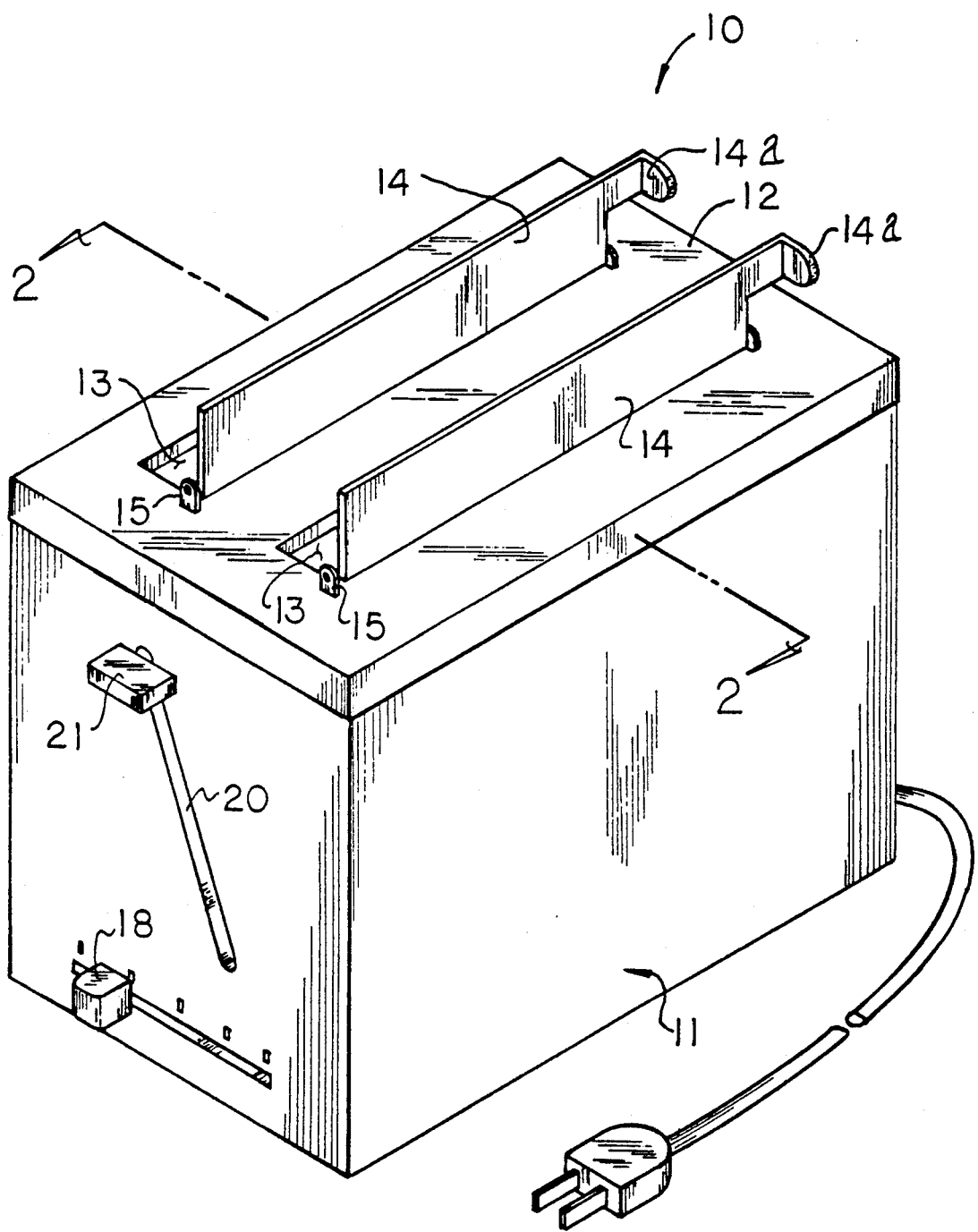
FIG. 1 is an isometric illustration of the instant invention.

With reference now to the drawings, and in particular to FIGS. 1 to 6 thereof, a new and improved toaster cover door apparatus embodying the principles and concepts of the present invention and generally designated by the reference numeral 10 will be described.

More specifically, the toaster door cover apparatus 10 of the instant invention essentially comprises a toaster assembly 11 having a top wall 12, with bread slots 13 directed therethrough. Each of the bread slots are of a predetermined width and of a predetermined length. A door plate 14 is hingedly mounted about an associated hinge member 15 in adjacency relative to each bread slot 13, wherein each door plate 14 is at least of a predetermined width and the predetermined length. The toaster assembly 11 is constructed and arranged with conventional heating elements 16 spaced apart to define a bread receiving gap 17 below each associated bread slot 13 to cooperate in a conventional manner in association with a thermostat 18 to effect toasting of bread directed into each gap 17. An elevator plate 19 is reciprocatably mounted interiorly of the toaster in cooperation with the slots to permit lowering of bread into each associated gap 17. The elevator plate 19 cooperates with a side wall slot 20 and includes an elevator plate handle 21 mounted to the elevator plate 19 exteriorly of a side wall of the toaster assembly 11 to permit selective manual lowering of a bread component within an associated gap 17. Each door plate 14, as illustrated in FIG. 1 for example, includes a handle flange 14a orthogonally oriented relative to each door plate to permit ease of manual manipulation of each door plate.

Figure 3:
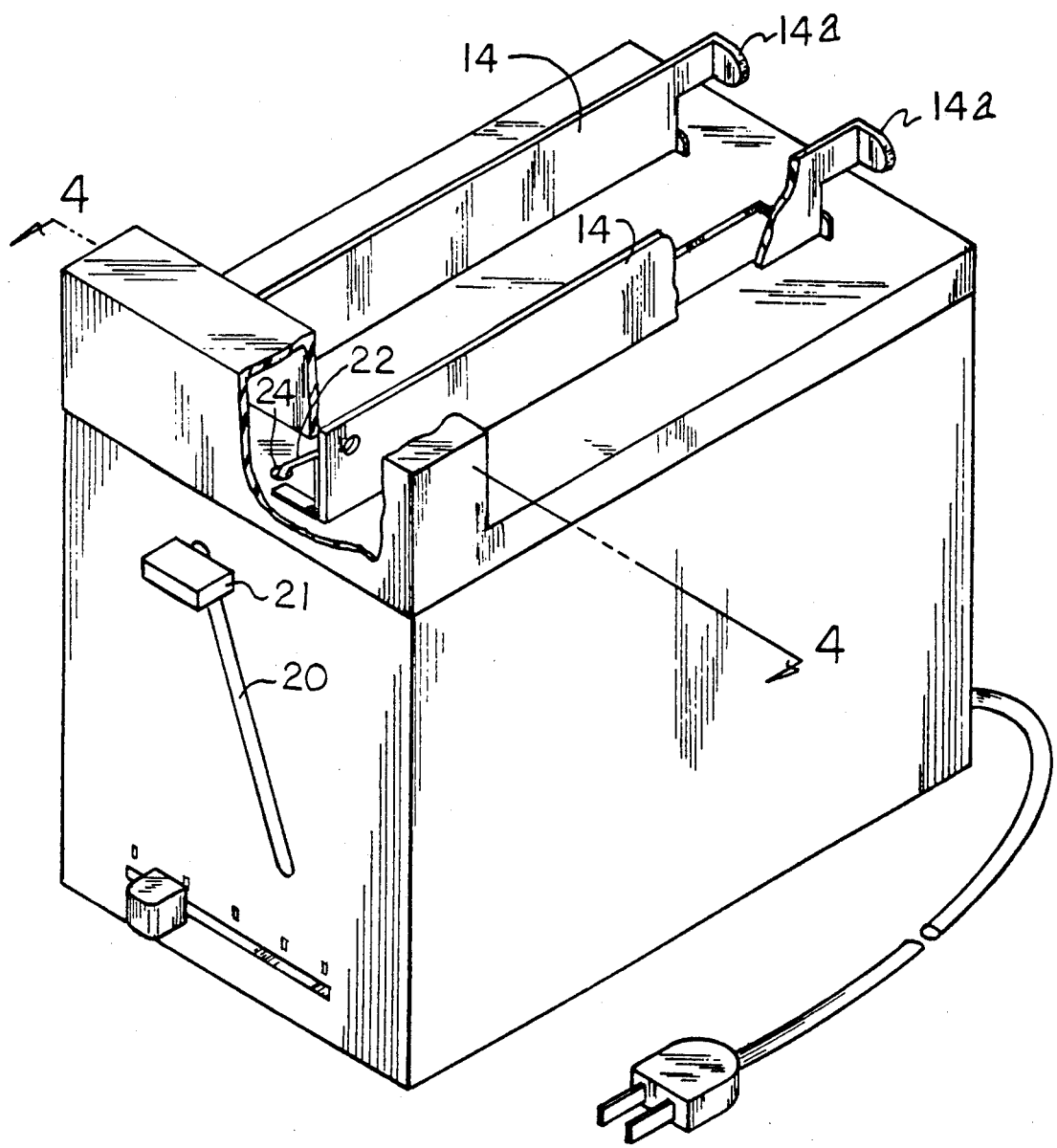
FIG. 3 is an isometric illustration of an automatic door closure structure as utilized by the invention.
Figure 2:
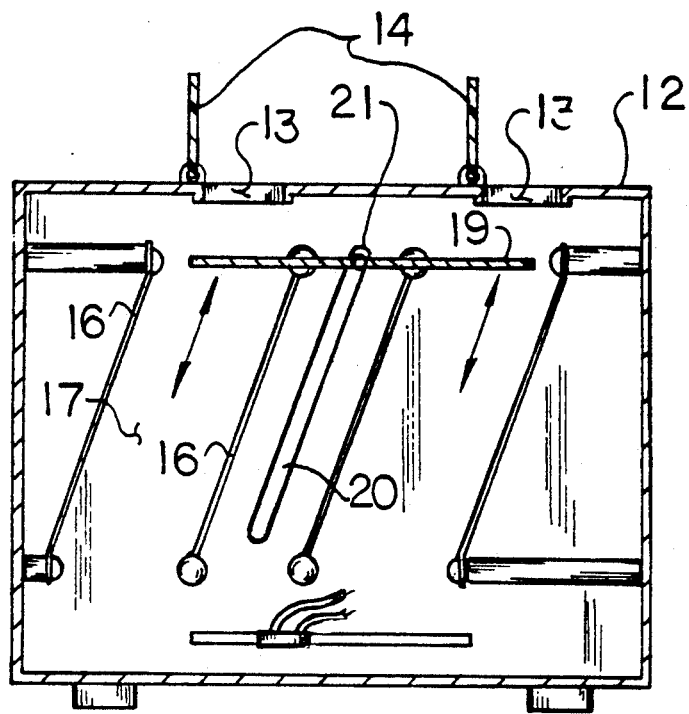
FIG. 2 is an orthographic view, taken along the lines 2—2 of FIG. 1 in the direction indicated by the arrows.
Figure 4:
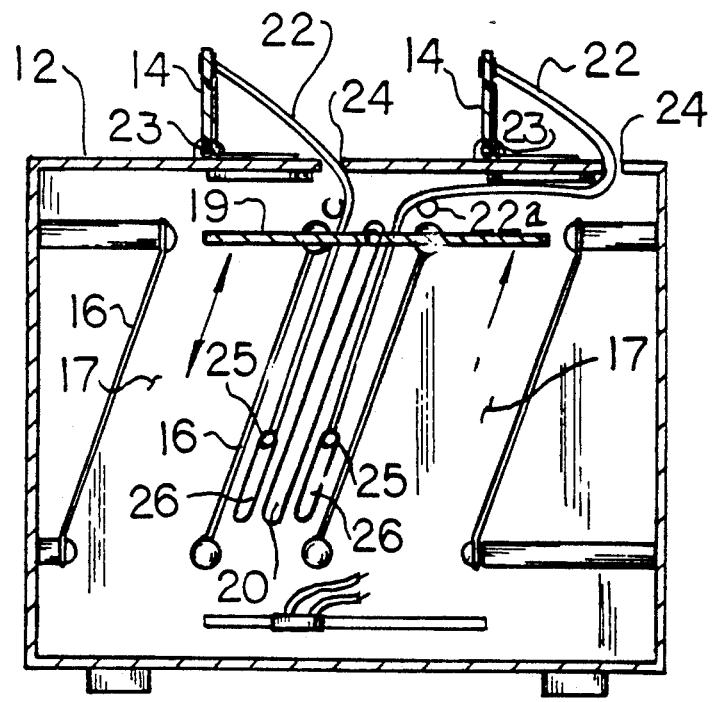
FIG. 4 is an orthographic view, taken along the lines 4—4 of FIG. 3 in the direction indicated by the arrows.

The FIGS. 3 and 4 indicate the apparatus utilizing automatic door closing structure to include a door cable 22 having a first end mounted to a respective door plate 14, with a second end directed into the toaster through an associated cable receiving opening 24 through the top wall 12 mounted to an abutment pin 25. Upon lowering of the elevator plate 19, the abutment pins 25 are contacted effecting tensioning of an associated cable 22 that in turn is directed about a guide boss 22a over and aligned with a respective abutment pin guide slot 26 permitting downward displacement of the guide pins 25 and associated tensioning of the cables 22 to effect closure of a door over a respective slot 13. A spring hinge 23 normally biases the doors in an orthogonal orientation relative to an associated slot 13.

Figure 5:
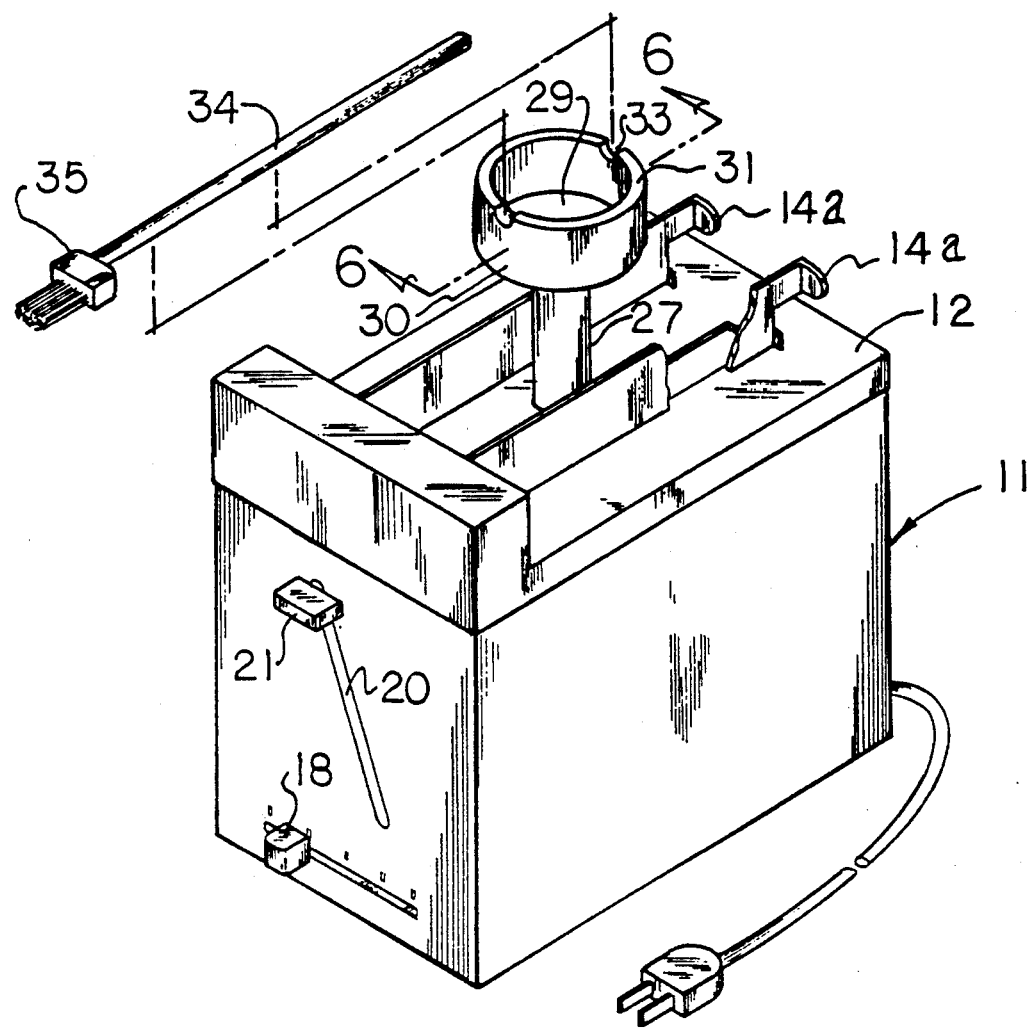
FIG. 5 is an isometric illustration of the invention utilizing a butter melting cup structure in association with the toaster.
Figure 6:
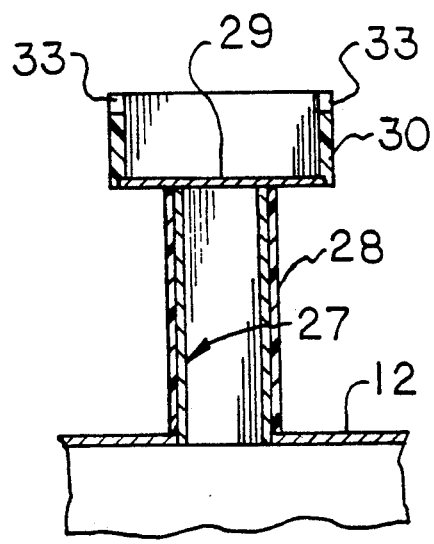
FIG. 6 is an orthographic view, taken along the lines 6—6 of FIG. 5 in the direction indicated by the arrows.

The FIGS. 5 and 6 indicate the structure further employing a cup member for melting of butter therewithin for spreading upon toast for convenience, formed with a heat tube 27 in communication within the toaster directed through the top wall 12. The heat tube 27 includes an insulative exterior liner 28 formed thereabout. A heat transmissive metallic floor 29 is mounted fixedly to an upper end of the heat tube 27 having a continuous side wall 30 formed of a non-heat transmissive polymeric material to avoid injury to an individual as is the purpose of the liner 28. The side wall 30 is formed with an upper edge 31 having a pair of support recesses 33 directed into the upper edge that are diametrically aligned relative to one another into the upper edge to support a brush handle 34. The brush handle 34 is formed with a head 35 having a matrix of bristles secured to the head to permit the spreading of butter and the like onto toast in use with the invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A toaster cover door apparatus, comprising in combination, a toaster assembly, the toaster assembly having a top wall and at least one side wall, with the top wall having at least one bread slot directed therethrough, the bread slot of a predetermined length and a predetermined width, and a door plate mounted over the at least one bread slot, and a hinge member hingedly mounting the door plate in adjacency relative to the bread slot in a parallel relationship relative to the bread slot, with the door plate defined by said predetermined width and said predetermined length, and spaced heating elements mounted within the toaster assembly below the at least one bread slot, with the heating elements spaced apart defining a bread receiving gap therebetween, and an elevator plate reciprocatably mounted within the gap, and wherein the elevator plate includes an elevator plate extension directed through the at least one side wall, with the at least one side wall having a side wall slot, with the extension directed reciprocatably within the slot, and the extension having a handle projecting exteriorly of the side wall to permit reciprocation of the elevator plate within the gap upon reciprocation of the extension within the slot, and the door plate includes a handle flange orthogonally and integrally mounted to a distal end of said door plate, and wherein the top wall includes a cable receiving opening directed therethrough, and a door cable, the door cable directed through the cable receiving opening having a first end secured to the door plate, and the door cable having a second end, and an abutment pin, and an abutment pin slot, the abutment pin slot positioned below the elevator plate exteriorly of the gap, and the cable second end secured to the abutment pin, whereupon downward projection of the elevator plate effects abutment with the abutment pin tensioning of the door cable to effect closure of the door plate overlying the at least one bread slot.

2. An apparatus as set forth in claim 1 including a guide boss positioned above the elevator plate in longitudinal alignment with the guide slot, with the door cable directed about the guide boss to align the door cable with the guide slot.

3. An apparatus as set forth in claim 2 including a heat tube directed through the top wall, the heat tube including an insulative liner directed thereabout, and a heat transmissive metallic plate secured to an upper distal end of the heat tube, and a polymeric continuous side wall orthogonally mounted in surrounding relationship relative to the floor.

4. An apparatus as set forth in claim 3 wherein the side wall upper edge includes a plurality of support recesses diametrically directed into the upper edge, and a brush handle, the brush handle arranged for reception within the recesses, the brush handle having a brush handle head and a matrix of bristles mounted to the brush handle head for application of a fluid to be contained within the cup member.

* * * * *